Sept. 21, 1937.    H. M. DODGE    2,093,909
METHOD OF MAKING DOLL HEADS
Filed March 25, 1936    3 Sheets-Sheet 1
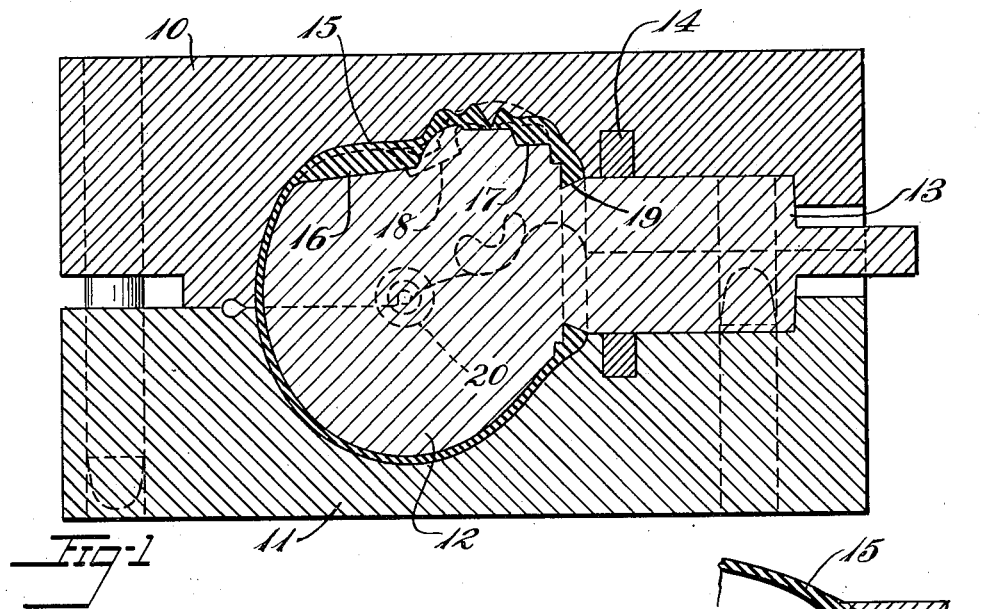
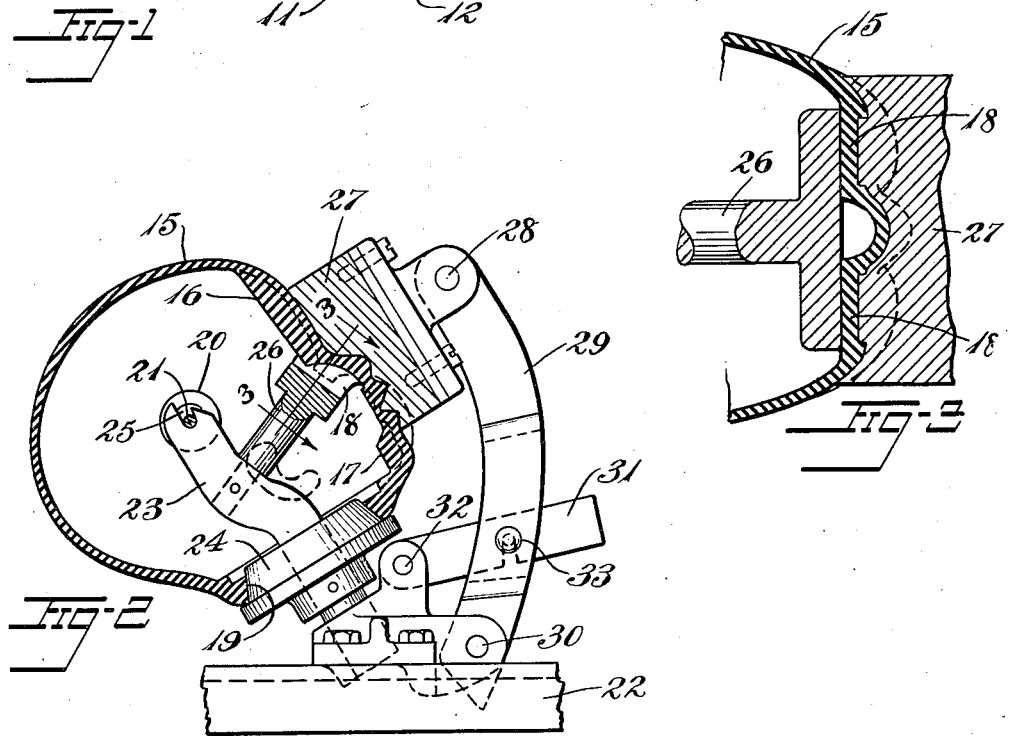
Inventor
Howard M Dodge
By Eakin & Avery
Attys Sept. 21, 1937.   H. M. DODGE   2,093,909
METHOD OF MAKING DOLL HEADS
Filed March 25, 1936   3 Sheets-Sheet 2
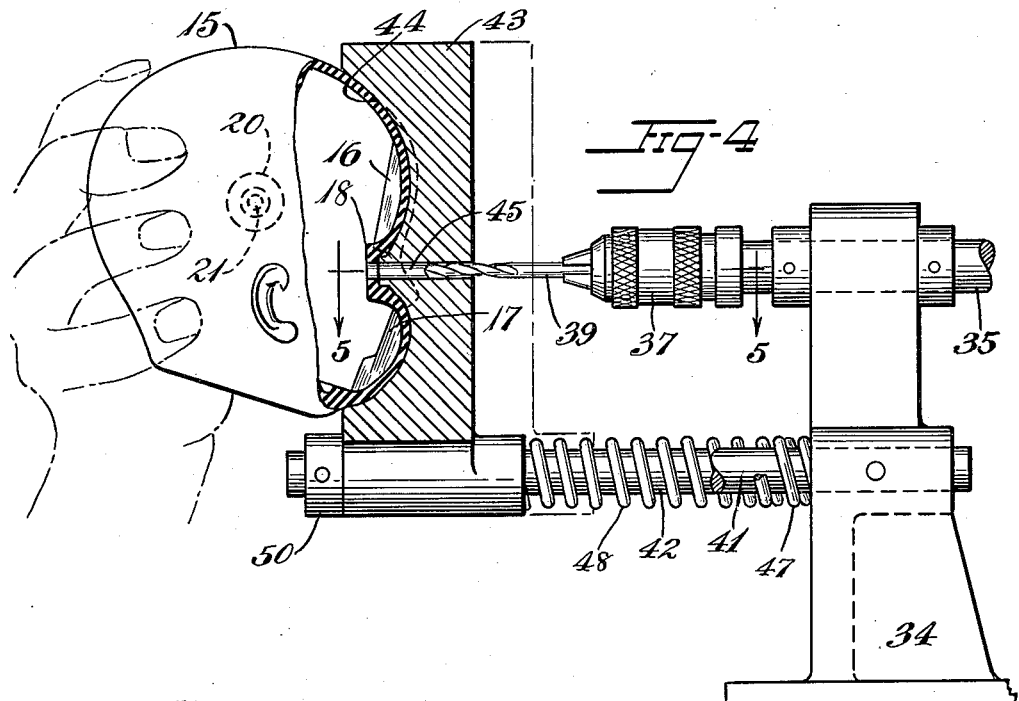
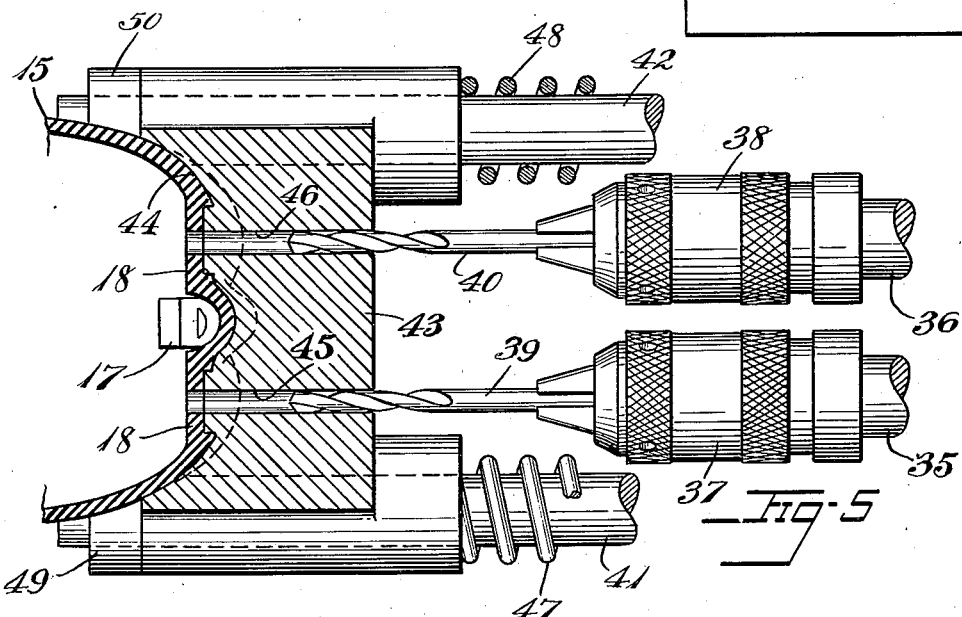
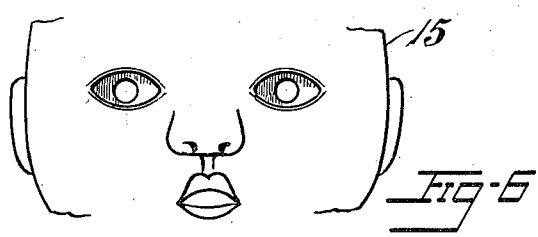
Inventor
Howard M. Dodge
By Eakin & Avery
Attys Sept. 21, 1937.  H. M. DODGE  2,093,909
METHOD OF MAKING DOLL HEADS
Filed March 25, 1936   3 Sheets-Sheet 3
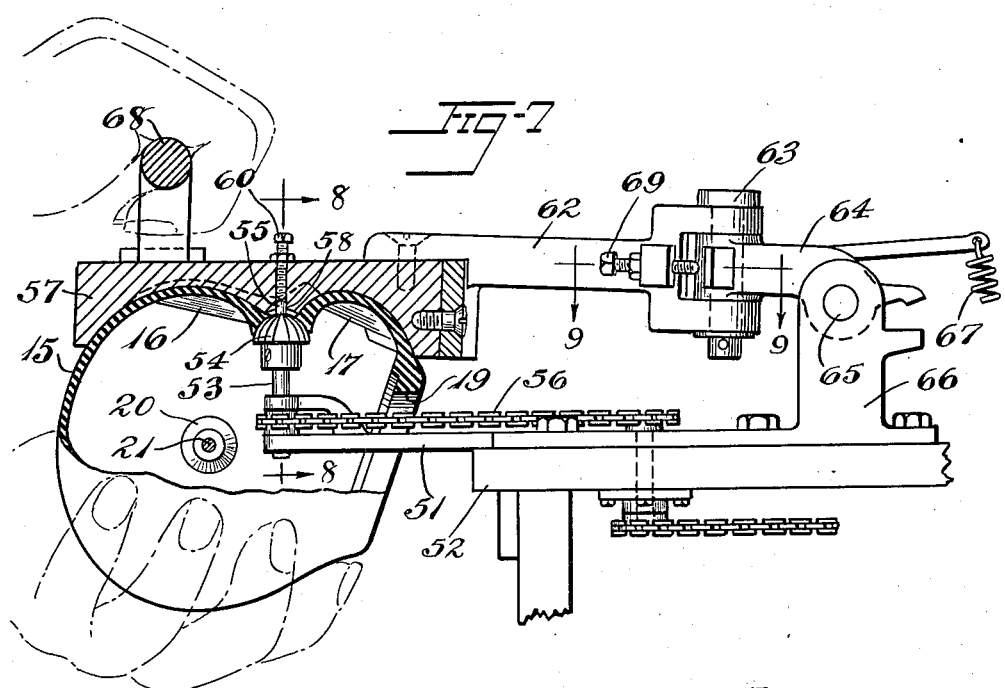
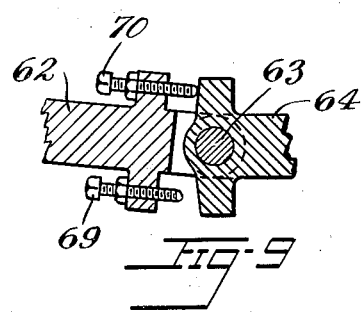
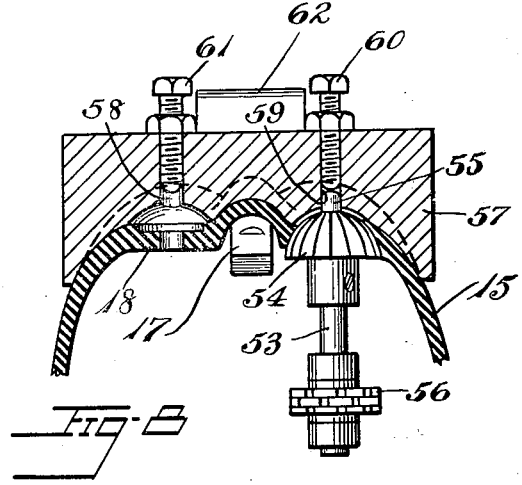
Inventor
Howard M Dodge
By Eakin & Avery
Attys Patented Sept. 21, 1937

2,093,909

UNITED STATES PATENT OFFICE 2,093,909

METHOD OF MAKING DOLL HEADS

Howard M. Dodge, Akron, Ohio, assignor to The B. F. Goodrich Company, New York, N. Y., a corporation of New York Application March 25, 1936, Serial No. 70,784

6 Claims. (Cl. 18—47.5)

This invention relates to methods of making doll heads of plastic material.

In the manufacture of doll heads formed of hard rubber or other plastic materials, especially where movable eye mechanism is to be mounted within the head, the accurate forming of the head becomes of great importance. Such plastic materials usually warp and shrink during the vulcanization or other hardening process, necessitating individual adjustment of the eye mechanism to conform to the head.

The principal objects of the present invention are to provide accuracy, efficiency and simplicity of procedure to provide a uniform product.

Other objects will appear from the following description and the accompanying drawings.

Of the drawings.

Fig. 1 is a sectional view of a mold for forming a doll head from plastic material, the doll head being shown in section therein.

Fig. 2 is a side elevation of a clamping mold used to hold the facial portions of the head in proper position during a subsequent vulcanization or drying step, the doll head being shown in place and in section.

Fig. 3 is a fragmentary sectional detail view taken on line 3—3 of Fig. 2, parts being broken away.

Fig. 4 is an elevation, partly in section, of a drilling device, the doll head being shown in place and in section, parts being broken away.

Fig. 5 is a sectional view taken on line 5—5 of Fig. 4.

Fig. 6 is a face view of the doll head after it has been drilled, parts being broken away.

Fig. 7 is a side elevation, partly in section, of a milling fixture used to form the spherically concave eye sockets, a doll head being shown in position thereon, partly broken away and partly in section.

Fig. 8 is a sectional detail view taken on line 8—8 of Fig. 7.

Fig. 9 is a sectional detail view taken on line 9—9 of Fig. 7.

Referring to the drawings, the first operation consists in molding the plastic material to the general shape of the head. In this operation the head is removed from the mold when in a soft pliable condition. When the heads are made of hard rubber composition, vulcanization is carried on until the product resembles soft vulcanized rubber. For this purpose a mold comprising a top plate 10, a bottom plate 11, and a core 12, made of rigid metal, is used. The core 12 has a shank 13 which fits a recess between the plates to properly support the core, a ring 14 on the shank of the core engages an annular recess formed in the mold plates.

As the head 15 is to be equipped with sleeping eye mechanism, the core 12 is shaped to form lugs 16 and 17 on the inside of the head to which the eye mechanism may be clamped. The core is also shaped to provide solid walls 18 where the eye sockets are later to be formed, and an internally tapered neck 19 where the head fits on the body. A pair of bosses 20 are also formed on opposite sides of the head adapted to receive a metal rod 21 by which the head is later to be retained on the body.

After the head has been molded and vulcanized to a pliable state, it is removed from the mold. The rod 21 is placed between the bosses 20. The head is then transferred to the molding device shown in Fig. 2. The object of the molding device is to hold certain parts of the head in proper relation while the vulcanization or hardening of the head is accomplished, other parts of the head being free to warp and shrink. It comprises a base 22 to which is fixed a standard 23 having a collar 24 for engaging the neck opening of the head and holding it to shape and size, and a notch 25 for engaging the rod 21. A laterally extending post 26 is fixed to the standard so as to engage the wall 18 of the eye sockets. A block 27 of rigid material has a face adapted to conform to the facial portion of the head, especially about the eyes, and is pivotally mounted at 28 to an arm 29 hinged at 30, to the base 22. A latch 31 hinged, as at 32, to the base 22 engages a pin 33 on arm 29 and holds the block 27 against the head.

Further vulcanization is accomplished by placing the head, clamped in this fixture, in an open steam vulcanizer. The block 27 and post 26 prevent shrinking or warping of the facial portions of the head and the collar 24 holds the neck opening in proper relation thereto. The head is not removed from the clamping device until it has cooled. Unsupported parts of the head may shrink freely.

Having accurately maintained the facial parts in the region of the eyes during completion of the vulcanization step, the eye sockets are machined to accommodate the eye balls. For this purpose the devices used in machining the sockets are located from the portions of the head which have been prevented from shrinking.

The first machining operation is accomplished by use of the drilling device illustrated in Figs. 4 and 5. Referring to those figures, a bracket 34 is formed with bearings for a pair of parallel drill spindles 35, 36 driven by means, not shown, from any source of power, not shown. These spindles are spaced on the same centers as the eye sockets desired in the head and are equipped with chucks 37, 38 for holding twist drills 39, 40. A pair of guide rods 41, 42 are fixed to the bracket 34 in parallel relation to the drill spindle. A carriage 43 is slidably mounted upon the guide rods and is formed with a work engaging face 44 formed to engage the face of the doll and with drill guide holes 45, 46. Coil springs 47, 48 are loosely mounted on rods 41, 42 between the carriage 43 and bracket 34. Stop collars 49, 50 limit outward movement of the carriage under influence of the springs.

The molded doll head is placed against the face 44 of the carriage and forced by hand with the carriage against the rotating drills. The appearance of the drilled head is then as shown in Fig. 6, and the drilled holes will be accurately spaced and located with respect to the facial features.

In order to form the spherical eye sockets the milling device shown in Figs. 7 to 9 is used. This device comprises a horn 51 extending from a bench 52, a vertical driven spindle 53 to which the milling cutter 54 is fixed, and means for pressing the doll head against the milling cutter. The milling cutter 54 is formed with a spherical cutting portion and a pilot 55 for guiding the cutter. The pilot is of such size as to freely enter and rotate in the holes drilled in the head. A chain 56 drives the spindle 53 from any source of power, not shown. The milling cutter, its spindle and the horn are of such dimensions that the neck of the doll head may be passed freely thereover.

To support the doll head a plate 57 has its lower face formed to conform to the facial surface of the doll head. Clearance openings 58, 59 are drilled therethrough for receiving the pilot 55, and stop screws 60, 61 are threaded therein so as to be adjustable to limit the depth of feed. Plate 57 is mounted upon an arm 62 hinged for lateral movement by a pin 63 to an arm 64, which in turn is hinged on a pin 65 for vertical movement in relation to a bracket 66 fixed to the bench 52. A coil spring 67 holds the arm 62 normally elevated. A handle 68 provides a convenient means of manipulating the plate.

To limit lateral movement of the arm 62 about pivot pin 63, stop screws 69, 70 are threaded through ears on arms 62 and are adapted to impinge against lugs formed on arm 64. The arrangement is such that arm 62 may be moved laterally to align either clearance opening 58 or 59 with the spindle 53 and may be depressed in either position to engage the head with the milling cutter.

The operator passes the head over the horn 51 and engages it against the lower face of the plate 55. Then by depressing the plate 55 with the head held thereagainst, as shown in Fig. 7, one of the drilled holes is passed over the pilot 55 and the desired material milled away, the stop screws 60, 61 limiting the depth of cut. By this method the spherical eye seats are formed in exact alignment with the drilled pilot holes.

I claim:

1. The method of making hollow doll heads which comprises, forming plastic material about a core to provide a one piece hollow pliable head, removing the core from the head, clamping facial portions of the head against distortion while leaving other portions of the head free from restraint, and hardening the material of the head while it is so held.

2. The method of making hollow doll heads which comprises, forming plastic material about a core to provide a one piece hollow pliable head, removing the head from the core by stretching the head, clamping facial portions of the head against distortion while leaving other portions of the head free from restraint, and hardening the material of the head while it is so held.

3. The method of making hollow doll heads which comprises forming plastic material about a core to provide a hollow one piece pliable head, removing the head from the core, clamping facial portions of the head against distortion while leaving other portions of the head free from restraint, hardening the material of the head while it is so held, and machining portions of the head by location from the portions that have been so clamped.

4. The method of making hollow doll heads which comprises forming plastic material about a core to provide a hollow one piece pliable head, removing the head from the core, clamping facial portions of the head against distortion while leaving other portions of the head free from restraint, hardening the material of the head while it is so held, drilling holes through the wall of the head to establish the centers of the eyes by location from the facial portions which were restrained from distortion, and milling spherical eye-sockets in the head by location from the drilled holes.

5. The method of making hollow doll heads which comprises, forming plastic material about a core to provide a one piece pliable head, temporarily stretching the head to remove the core therefrom, clamping facial portions of the head against distortion while leaving other portions of the head free from restraint, hardening the material of the head while it is so held, and machining portions of the head by location from the portions that have been so clamped.

6. The method of making hollow doll heads which comprises, forming plastic material about a core to provide a hollow one-piece pliable head, temporarily stretching the head to remove it from the core, clamping facial portions of the head against distortion while leaving other portions free from restraint, hardening the material of the head while it is so held, drilling holes through the wall of the head to establish the centers of the eyes by location from the facial portions which were restrained from distortion, and milling spherical eye sockets in the head by location from the drilled holes.

HOWARD M. DODGE.